July 26, 1938.  W. W. HAMILL  2,125,018
PLUG FOR INSERTION IN WALLS AND OTHER PLACES
Filed Nov. 25, 1935
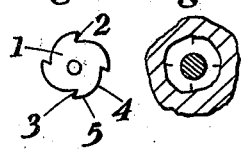
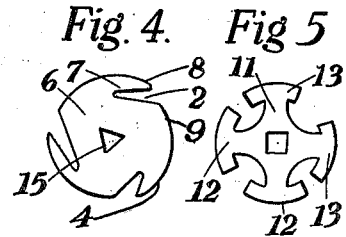
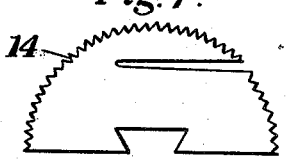
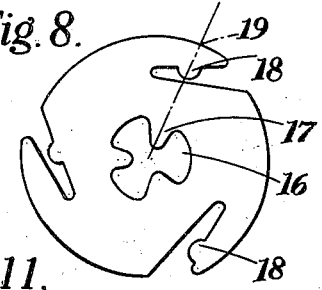
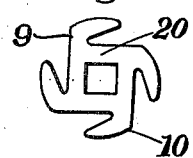
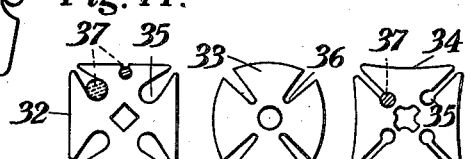
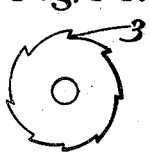
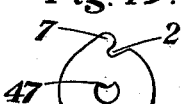
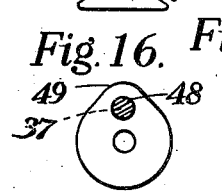
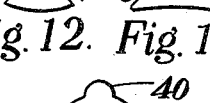
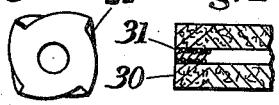
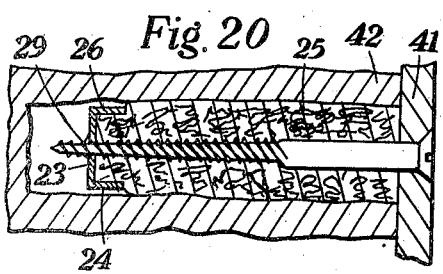
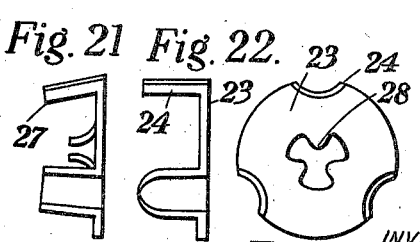
INVENTOR
William W. Hamill
BY
ATTORNEY Patented July 26, 1938

2,125,018

UNITED STATES PATENT OFFICE 2,125,018

PLUG FOR INSERTION IN WALLS AND OTHER PLACES

William Wilson Hamill, Chigwell, England

Application November 25, 1935, Serial No. 51,541
In Great Britain December 18, 1934

14 Claims. (Cl. 85—2.4)

This invention relates to plugs for insertion in walls, floors, ceilings, and other places for attachment or support of objects, of the kind expanded by an instrument driven into the bore.

The object of the invention is the provision of improved plugs by which resistance to turning under the effect of the instrument of expansion such as a screw is increased in the initial stages of expansion; which widens the range of cavity sizes which a given plug will fit; and which can be fabricated by economical industrial processes.

Having the aforesaid and other objects in view as will appear from a perusal of the following specification, the present invention consists in a rubber or like elastic sleeve plug having one or more peripheral longitudinal pieces flexibly anchored to the plug body so that the free part of the piece can be moved outwards or inwards to suit various cavity diameters.

The invention further consists in a plug which includes one or more longitudinal flutes in the plug bore or tunnels in the plug body, the material being displaced from the flutes and tunnels and restored to the periphery to form thereon one or more longitudinal projections which increase the diametrical dimension without increasing the cross-sectional area of rubber. Such cross-sections cover a larger range of cavity diameters for a given cross-sectional area of rubber.

The invention further consists in a plug provided on its periphery with grooves, corners or ribs which do not run parallel to the plug axis but are twisted such as helically in order that the plug when inserted in the cavity in the twisted condition and the outer end turned by an expanding screw, tends to untwist and enlarge the outside diametrical dimension so that the corners grip the cavity bore and prevent turning of the plug therein.

The invention further consists in a rubber or like sleeve plug which is expanded by an instrument driven into its bore, and which is provided with means by which the said instrument reduces the length of the sleeve by compression to superimpose on the primary expansion a second expansion. By such means, the ratio of unenlarged to maximum cross-sectional area is higher than by simple expansion alone, and the plug of given size will fit oversize cavities.

The invention further consists in a rubber or like sleeve plug having the area of the bore surface in contact with the expanding instrument periphery reduced in comparison with a circular bore, in the early stages of expansion. The instrument of expension can be more readily driven in since friction is reduced, and the material displaced can be restored to the periphery as already referred to.

In the accompanying drawing, Figure 1 is an end view of the cross-section of a simple form of plug according to the invention before insertion, Figure 2 showing how the projections merge into the body of the plug during or after expansion.

Figure 3 is a side elevation of Figure 1.

Figures 4–17 are end views showing the cross-section of various constructions of plug according to the invention.

Figures 18 and 19 show a grooved plug fabricated in a twisted shape.

Figure 20 illustrates sectionally a plug in situ having means for shortening the length by compression, for setting up the dual expanding effects.

Figures 21–23 show separately enlarged views of a metal disc included in Figure 20.

Figure 24 is a fragmentary view of the inner end of a plug with a harder section to act as a nut for the expanding screw.

The number of flutings, flaps or arms can be varied as desired, three to five being generally most convenient.

In Figures 1–3 the plug 1 of rubber or like material having similar properties to rubber is formed on its periphery with longitudinal flutes, grooves or channels 2 which extend radially inwards to present undercut faces 3 and are curved at 4 so that the plug periphery includes or is made up of a plurality of curved flaps 5 of equal or unequal perimeter the leading ends of which are more remote from the axis than the trailing ends. Said flaps can be regarded as articulated at one end to the plug body and movable at the other end to contact with the cavity bore. With constant area of rubber, this kind of plug can be larger diametrically. As shown, it is suitable for right hand screw threads; for left hand threads, it is inserted the opposite way in the cavity. With undersize and correct-size cavities, the plug is readily inserted by a slight twist in an anti-clockwise direction which reduces the maximum diameter and allows the flaps to move inwards and turn easily in the cavity; in oversize cavities, the several points of maximum diameter will contact with the cavity bore. The frictional resistance to turning by the expanding screw is augmented by the form of the flaps which tend to hinge outwardly and grip the cavity. While the grooves are present in the early stages of expansion, they finally disappear and merge into the plug body producing the close-fitting characteristic of an unbroken plug as indicated in Figure 2.

Plugs of uniform cross-section throughout their length are readily fabricated by extruding in long lengths and subsequently cutting into shorter lengths.

The hinging action of the flaps is effective also where a driving nail or screw nail is used, to augment the range of cavity sizes for a given nail.

The longitudinal grooves or slits 2 in Figure 4 are more tangential than those in Figure 1, and provide for each groove a more or less radial arm 6 and a peripheral segment 7 attached cantilever-wise to the outer end of the arm with a space intervening between the free end 8 of one flap and the anchored end 9 of its neighbour. The length of the slit is varied according to the length of flap desired; the flaps may be of different lengths as illustrated in Figure 4 or of the same length as in Figure 6; and the slits may be tapered as indicated, or parallel, or irregular. As in Figure 1, the peripheral surfaces 4 of the flaps are preferably shaped to a curve eccentric to the plug axis; at 10, Figure 9, they are shown concentric.

Another action of the segmental flaps is that when the rotation of the screw is reversed, they return easily since they are then trailing behind their zones of connection with the plug body, and pull instead of thrust is applied to them.

A bi-directional effect is obtainable by making the connecting arms 11 Figure 5 with symmetrical segments 12 for equal effect in each direction of rotation, or asymmetrical as at 13 for unequal effect.

The peripheral surfaces of the flaps may be smooth or serrated grooved, Figure 7 showing serrations 14 of constant pitch and some of different pitch.

Reduction of the initial contact area of screw periphery and plug bore is effected by a cross-section of bore other than the circular shown in Figure 1, expanding pressure being applied to restricted areas and in pre-determined directions. Polygonal cross-sections include triangular 15 Figure 4; square Figure 9; and pentagonal Figure 10, the number of faces corresponding to the number of flaps or segments so that the zones of contact with the screw transmit radial pressure to and support the inner faces of the flaps through the body of rubber lying between the bore and the slits. Other alternative shapes may obviously be used to restrict screw-contact area, reduce friction, increase the range of screw diameters for a given plug, and facilitate entry of the screw. In Figure 8 the bore is made with longitudinal channels 16 and inward projections 17 the tips of which contact with the screw periphery. As with the peripheral projections, the bore projections merge into the plug body as expansion proceeds.

Other constructions include buttresses or bridging projections on the surface of the slits as at 18 Figure 8 through which radial pressure set up by the expanding screw is applied in the early stages of expansion through the restricted areas of said buttresses and in pre-determined directions from the bore passing along lines including the buttresses. Said projections extend longitudinally the full length of the slits, and are usable with circular or interrupted bore. With the latter, the bore contact zones are aligned along radial lines 19 passing through the buttresses.

With more particular reference to Figure 8, it will be noted that when the expanding action takes place, the initial expanding pressure is against the projection 17 and the expanding movement along the line indicated at 19 will act through the bridging projections 18 on the flaps and thus produce a pressure movement of the flaps which is amplified approximately in the ratio of 2 to 1. Thus, the tip of the flap moves twice as fast as the projection 17, and the effect of this amplified motion is to insure quick and easy expansion of the plug practically at the very beginning of such expansion so as to resist any turning tendency in the plug practicaly coincident with the expansion movement. This is further incident to the construction shown in Figures 4, 6 and 9 because in these figures a definite area of the bore will receive initial expansion effect and this area of the bore acting on the flap intermediate the fulcrum and load necessarily substantially doubles the movement of the free end of the flap, primarily with a view to insuring that movement of the flap necessary to retard any turning tendency in the plug at practically the initial moment of expansion by movement of the expansion element in the bore.

The plug Figure 9 is of hollow square section 20 with a flap at each corner; the plug Figure 10 is pentagonal in cross-section with longitudinal peripheral crescent-shaped grooves 21 and with the bore corners in radial alignment with the middles of the flats on the periphery; the plugs Figures 11–13 are four-sided externally with the slots radial. In Figure 11, the sides 32 are flat, in Figure 12 they are convex and in Figure 13 concave, while in Figures 11 and 13 the slots 35 are widest at their inner ends, and in Figure 12 the slots 36 are narrowest at their inner ends.

The effect of the longitudinal channels in any of the sections can be modified to enable the plug to fit an oversize cavity by the insertion of one or more filling pieces of harder material in one or more of the channels when the section inlcudes a plurality as indicated at 37 Figures 11, 13 and 16, since one of the characteristics of rubber or like plugs is that the cross-sectional area of the plug plus that of the screw must at least equal the area of the cavity so that the rubber first flows to fill the cavity cross-sectionally and is then subjected to compression to obtain high grip.

Irregular sections are shown in Figures 14–17. In Figure 14 the flaps are irregularly spaced with undercut leading edges 3; in Figure 15 a single peripheral groove 2 provides a single flap 7, and the bore has a single inward projection 47 in radial line with the flap; in Figure 16 a longitudinal tunnel 48 (or tunnels) is formed in the body of the plug, and the material replaced as a single peripheral projection 49; and in Figure 17 the general diameter is slightly reduced and the material which is thus saved is replaced as a single projection 40 on the periphery.

A grooved plug of twisted configuration, specifically a helix 22 is the subject of Figures 18 and 19. Conveniently the angle of twist lies between 15-60°, and the direction of twist is the same as that of the screw used for expanding, i. e. right hand for right hand thread. The twist is impartable during extrusion or after extrusion and before vulcanizing. Any of the sections shown may be manufactured in this manner. Turning the illustrated plug counter-clockwise enables it to be readily inserted in a small or close-fitting cavity to increase the helix angle and reduce the maximum diameter, the action being reverse to that of the screw which tends to untwist and enlarge the plug as previously explained.

Another construction particularly useful for oversize cavities forms the subject of Figures 20–23 wherein a centrally-perforated metal disc 23 is anchored to the inner end of the sleeve plug 25 to function as a nut. Said disc is anchored by means of projecting tongues 24 which engage the plug peripheral grooves 26 and are a tight fit therein, or alternatively they may be inclined as at 27 Figure 21 and clenched to prevent separation during transport. The central perforation is preferably non-circular with inwardly-projecting teeth 28 corresponding in number to the plug grooves, and the metal is plunged and formed with the semblance of a screw to facilitate entrance of the leading end 29 of the screw. Alternatively, the metal disc can be moulded in the rubber, or the rubber may be made to constitute the nut by forming a harder region 30 Figure 24 at the inner end moulded as a screw thread 31.

The radial displacement of the rubber which occurs from the normal expansion when the tapered screw is driven into the plug bore is augmented by the displacement which accompanies the axial shortening and compression of the sleeve as the screw engages the nut and the screw and nut thereby mutually approach, the reaction being taken firstly against the screw head, or where an object 41 is interposed between the wall 42 or the like and the screw head, through said object to the screw head. An increased grip is thus possible since the rubber does not tend to flow endwise or exude from the cavity mouth when a certain tensile stress is exceeded in the rubber. Cavities of diameters unsuitable for receiving any of a standardized range of plugs, can thereby be accommodated as there is a much greater margin of expansion in this kind of plug.

Having thus described my invention, what I claim is:

1. A flexible rubber plug to be secured within a wall or other cavity, said plug having a normal over-all diameter, the surface of the plug being formed to yield to avoid increase of frictional resistance between the surface of the plug and the wall of the opening when the plug is turned in one direction and to engage the wall of the opening with increasing frictional resistance against turning when the plug is turned in the opposite direction.

2. A flexible rubber plug to be secured within a wall or other cavity, said plug having a normal over-all diameter, the surface of the plug being formed to yield to avoid increase of frictional resistance between the surface of the plug and the wall of the opening when the plug is turned in one direction and to engage the wall of the opening with increasing frictional resistance against turning when the plug is turned in the opposite direction, the plug being formed with a longitudinal bore to receive a plug-expanding instrument to bind the plug within the cavity by expansion of the plug.

3. A rubber plug to be secured within a wall or other cavity, said plug having a normal over-all diameter, the surface of the plug being formed with projections free for bodily movement toward and from the body of the plug except at the point of connection, the projections yielding to prevent increase of frictional resistance when the plug is turned in one direction within the cavity, said projections tending to move from the body of the plug to increase frictional resistance against turning movement of the plug under opposite turning effort thereof.

4. A rubber plug to be secured within a wall or other cavity, said plug having a normal over-all diameter, the surface of the plug being formed with projections free for bodily movement toward and from the body of the plug except at the point of connection, the projections yielding to prevent increase of frictional resistance when the plug is turned in one direction within the cavity, said projections tending to move from the body of the plug to increase frictional resistance against turning movement of the plug under opposite turning effort thereof, said plug being formed with a longitudinal bore to receive an expansion instrument for compressing the body of the plug between the instrument and the wall of the cavity.

5. A rubber plug to be inserted within a wall or other cavity, including a body, flaps secured at one end to the body and spaced throughout their remaining lengths from the body; said flaps being movable toward contact with the body to reduce the frictional resistance when turning the plug in one direction within the cavity, the free portions of the flaps tending to move outwardly from the body to increase the frictional resistance in a turning effort on the body in the opposite direction within the cavity, whereby the plug may be inserted in the cavity by turning in one direction and resist turning in the cavity in the opposite direction.

6. A rubber plug to be inserted within a wall, or other cavity, including a body, flaps secured at one end to the body and spaced throughout their remaining lengths from the body, said flaps being movable toward contact with the body to reduce the frictional resistance when turning the plug in one direction within the cavity, the free portions of the flaps tending to move outwardly from the body to increase the frictional resistance in a turning effort on the body in the opposite direction within the cavity, whereby the plug may be inserted in the cavity by turning in one direction and resist turning in the cavity in the opposite direction, the plug being formed with a longitudinal bore to receive an expansion instrument for compressing the body of the plug and flaps between the instrument and wall of the cavity.

7. A construction as defined in claim 5, wherein the flaps extend substantially tangentially of the body.

8. A construction as defined in claim 6, wherein the bore is non-circular in sectional form.

9. A construction as defined in claim 6, wherein the entrant end of the body is provided with an element for cooperation with the expanding instrument to assist the latter in its expanding movement.

10. A flexible plug to be secured within a wall or other cavity, said plug having a normal over-all diameter and being formed with a longitudinal bore, the surface of the plug being formed to tend to an increase in the normal diameter of the plug when turning the plug in one direction to thus resist turning in said direction, an element cooperating with the bore of the plug to compel an expansion of the plug as the element is moved into the bore, the plug expanding movement of the element tending to turn the plug in that direction resisted by the surface formation of the plug, and means associated with the plug and cooperating with the element to compel endwise compression of the plug in the movement of the element to further assist in the expansion of the plug within the cavity.

11. A flexible plug to be secured within a wall or other cavity, said plug having a longitudinal bore, with the surface of the plug formed with flaps connected at one end to the plug and free of the plug at their opposite ends, with means in the bore of the plug to respond to an expansion element inserted in the bore, said means expanding the plug initially in line with a part of the flap intermediate its connected and free end.

12. A flexible plug to be secured within a wall or other cavity and formed with a longitudinal bore, the surface of the plug having flaps connected at one end to the plug and free at their opposite ends, the cross-sectional contour of the bore providing means responsive to the action of an expanding element to be introduced into the bore to cause an initial expansion of the plug in line with a part of one or more of the flaps to cause an amplified expanding movement of the free end of the flap in the initial expanding movement of the plug from within the bore.

13. A flexible plug to be secured within a wall or other cavity and formed with a longitudinal bore and surface flaps anchored at one end to the plug and free of the plug at their opposite ends, projections within the bore of the plug responding to the action of an expansion element to be inserted in the bore to initially compel expansion of the plug in radial alignment with an intermediate portion of the flap, whereby the out-spreading movement of the free end of the flap is amplified.

14. A flexible plug to be secured within a wall or other cavity, said plug being provided with a longitudinal bore and surface flaps secured at one end to the plug and free of the plug at their opposite ends, projections within the bore to compel initial expansion of the plug in response to an expanding element introduced in the bore along predetermined lines radially of the plug, and projections on those surfaces of the flaps next the plug proper and in more or less alignment with the radial line of expansion resulting from said projections within the bore.

WILLIAM WILSON HAMILL.